(12) United States Patent
Hebsur et al.

(10) Patent No.: US 10,110,678 B2
(45) Date of Patent: Oct. 23, 2018

(54) SYSTEM AND METHOD FOR DATA COMMUNICATION BASED ON IMAGE PROCESSING

(71) Applicant: SONY CORPORATION, Tokyo (JP)

(72) Inventors: Abhijit Hebsur, Bengaluru (IN); Madhvesh Sulibhavi, Bengaluru (IN); Pramod Chintalapoodi, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 95 days.

(21) Appl. No.: 15/241,719

(22) Filed: Aug. 19, 2016

(65) Prior Publication Data

US 2018/0054487 A1 Feb. 22, 2018

(51) Int. Cl.
*G06F 3/0484* (2013.01)
*H04L 29/08* (2006.01)
(Continued)

(52) U.S. Cl.
CPC ............ *H04L 67/12* (2013.01); *G06F 1/1686* (2013.01); *G06F 3/011* (2013.01); *G06F 3/0304* (2013.01);
(Continued)

(58) Field of Classification Search
CPC .......... H04L 67/12; G06K 9/62; G06F 3/005; G06F 3/04842; G06F 3/04817;
(Continued)

(56) References Cited

U.S. PATENT DOCUMENTS 8,751,942 B2 6/2014 Lopez et al.
2010/0317332 A1* 12/2010 Bathiche ............... H04B 1/202
455/418
(Continued)

FOREIGN PATENT DOCUMENTS

JP 2003-102077 A 4/2003
KR 10-2011-0117496 A 10/2011
(Continued)

OTHER PUBLICATIONS

Fujitsu Laboratories Ltd, "Fujitsu Develops Easy Way to Transfer Files With Video of PC Screens Shot by Mobile Devices", Kawasaki, Japan, Jan. 21, 2013 Available at : http://www.fujitsu.com/global/about/resources/news/press-releases/2013/0121-01.html.
(Continued)

*Primary Examiner* — Ibrahim A Khan
(74) *Attorney, Agent, or Firm* — Chip Law Group

(57) ABSTRACT

Various aspects of a system and method for data communication based on image processing are disclosed herein. In accordance with an embodiment, the system includes a first electronic device, which control display of an image on the first electronic device. The image includes one or more other electronic devices communicatively coupled to a wireless communication network. The one or more other electronic devices are identified in the displayed image based on an identity parameter associated with the one or more other electronic devices. A second electronic device of the identified one or more other electronic devices is controlled based on device settings associated with the identified one or more other electronic devices.

18 Claims, 9 Drawing Sheets

(51) Int. Cl.
  *G06T 19/00* (2011.01)
  *G06K 9/62* (2006.01)
  *G06F 3/0488* (2013.01)
  *G06F 3/16* (2006.01)
  *G06F 1/16* (2006.01)
  *G06F 3/01* (2006.01)
  *G06F 3/03* (2006.01)
  *H05B 37/02* (2006.01)
  *H04W 88/02* (2009.01)

(52) U.S. Cl.
  CPC ........ *G06F 3/0488* (2013.01); *G06F 3/04847* (2013.01); *G06F 3/04883* (2013.01); *G06F 3/16* (2013.01); *G06K 9/62* (2013.01); *G06T 19/006* (2013.01); *H05B 37/0272* (2013.01); *H04W 88/02* (2013.01)

(58) Field of Classification Search
  CPC ............. G06F 3/04883; G06F 3/04845; G06T 19/006; H04W 88/02
  See application file for complete search history.

(56) References Cited

U.S. PATENT DOCUMENTS

| | | | |
|---|---|---|---|
| 2012/0117193 A1 | 5/2012 | Phillips et al. | |
| 2015/0310664 A1* | 10/2015 | Boussard | G06T 19/006 345/633 |
| 2015/0347850 A1* | 12/2015 | Berelejis | G06K 9/00671 345/633 |
| 2015/0356949 A1* | 12/2015 | Kim | H04W 4/21 345/173 |
| 2016/0005229 A1* | 1/2016 | Lee | G06F 3/0488 345/419 |
| 2016/0112654 A1* | 4/2016 | Seo | G01J 3/463 348/333.12 |
| 2017/0034468 A1* | 2/2017 | Won | H04N 5/4403 |
| 2017/0048648 A1* | 2/2017 | Lee | H04W 4/70 |
| 2017/0083268 A1* | 3/2017 | Cho | G06F 3/0346 |
| 2017/0108997 A1* | 4/2017 | Kim | G06F 3/0482 |
| 2017/0134553 A1* | 5/2017 | Jeon | H04W 4/70 |
| 2017/0168667 A1* | 6/2017 | Jeon | G06F 3/16 |
| 2017/0185276 A1* | 6/2017 | Lee | G06F 3/04847 |

FOREIGN PATENT DOCUMENTS

| KR | 10-2013-0048533 A | 5/2013 |
|---|---|---|
| KR | 10-2014-0088052 A | 7/2014 |

OTHER PUBLICATIONS

Office Action for KR Patent Application No. 10-2017-0101098, dated Aug. 21, 2018, 07 pages of Office Action and 05 pages of English Translation.

* cited by examiner

US 10,110,678 B2

SYSTEM AND METHOD FOR DATA COMMUNICATION BASED ON IMAGE PROCESSING

CROSS-REFERENCE TO RELATED APPLICATIONS/INCORPORATION BY REFERENCE

None.

FIELD

Various embodiments of the disclosure relate to a system and method for data communication. More specifically, various embodiments of the disclosure relate to a system and method for data communication based on image processing.

BACKGROUND

Advancements in the field of communication technology have enabled data communication among electronic devices in a wireless network. For example, emerging technologies like "All-joyn" or Internet-of-Things (IoT) framework have reduced certain complexities for data communication among electronic devices in a wireless network. However, still in certain scenarios, it may be difficult to establish a communication between the electronic devices to achieve a desirable result. Further simplification of the data communication process may be desirable. An enhanced system may be required that may not only simplify the data communication process among the electronic devices but also provide an intuitive experience to a user performing the data communication.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and a method for data communication based on image processing substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
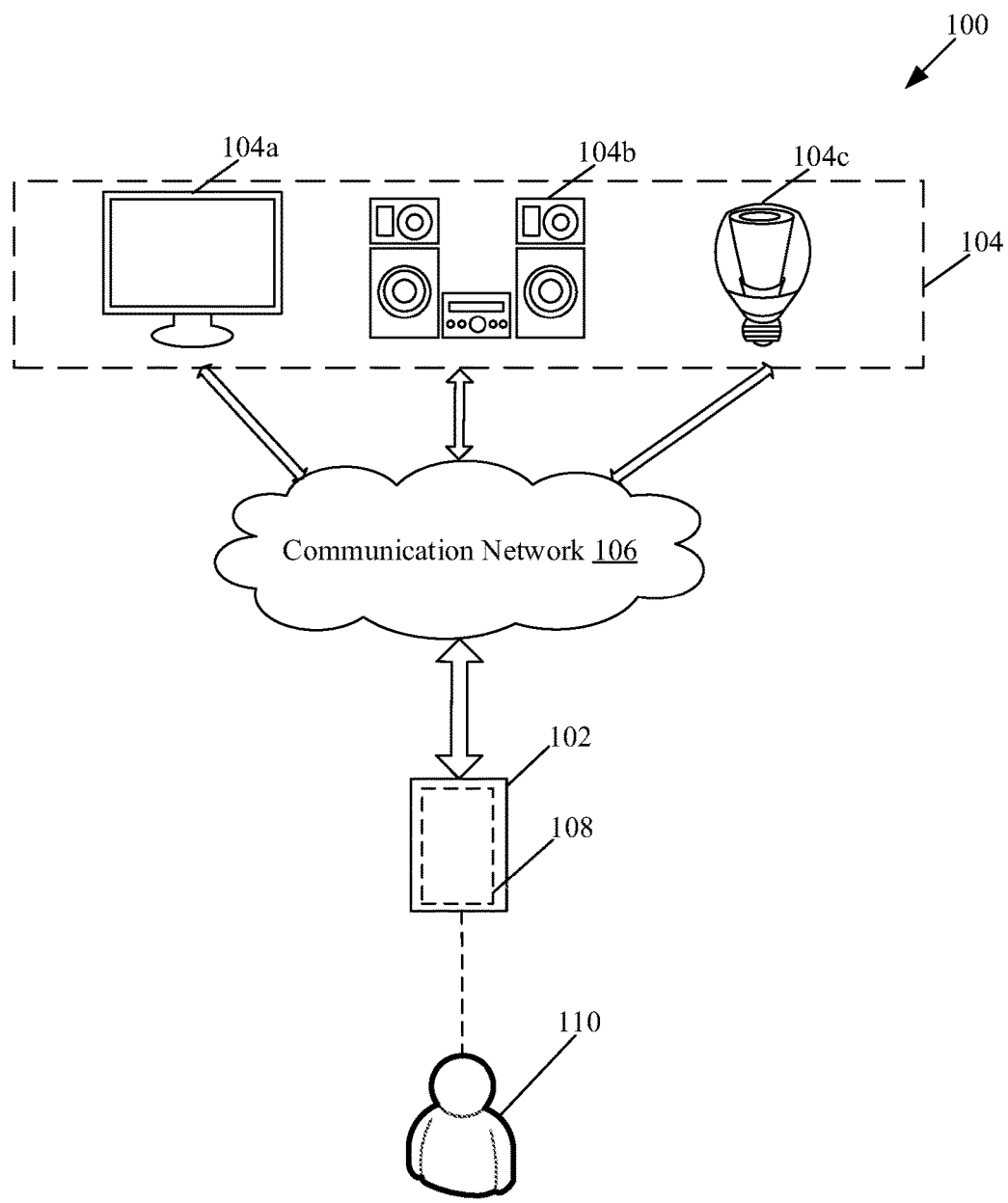
FIG. 1 is a block diagram that illustrates a network environment for data communication based on image processing, in accordance with an embodiment of the disclosure.

The following described implementations may be found in disclosed system and method for data communication based on image processing. Exemplary aspects of the disclosure may comprise a method that may control display of an image on a first electronic device. The image may comprise one or more other electronic devices communicatively coupled to a wireless communication network. The one or more other electronic devices may be identified in the image based on an identity parameter associated with the one or more other electronic devices. A second electronic device of the identified one or more other electronic devices may be controlled based on device settings associated with the identified one or more other electronic devices.

In accordance with an embodiment, the first electronic device may correspond to an Internet-of-Things (IoT) device with an in-built image-capturing unit. The one or more other electronic devices that includes the second electronic device may correspond to one or more other IoT devices, connected to the wireless communication network.

In accordance with an embodiment, one or more visual cues associated with the one or more other electronic devices may be detected in the image by use of an image processing technique. The one or more visual cues may correspond to a device mark, a device texture, a shape, a size, a device configuration, and/or other device identifiers.

In accordance with an embodiment, a device-type may be identified based on the detected one or more visual cues, the identity parameter, a location of the first electronic device, an orientation of the first electronic device with respect to the one or more other electronic devices, a distance of the one or more other electronic devices from the first electronic device that displays the image. In accordance with an embodiment, the identity parameter of the one or more other electronic devices may correspond to an Internet Protocol (IP) address, a Media Access Control (MAC) address, a unique device identifier, and/or a Service Set Identifier (SSID).

In accordance with an embodiment, a connection may be established with the identified one or more other electronic devices in the wireless communication network based on the identity parameter. An augmented-reality (AR) view may be generated on the first electronic device to enable the control of the identified one or more other electronic devices. The AR view may comprise a field-of-view (FOV) of the one or more other electronic devices, one or more graphical controls associated with the identified one or more other electronic devices displayed within the FOV, and/or one or more content items compatible as per the device-type of the identified one or more other electronic devices.

In accordance with an embodiment, one or more graphical controls may be generated on the AR view according to the device-type of each of the identified one or more other electronic devices within the FOV. A content item may be selected from the AR view on the first electronic device. The selected content item may be dragged towards a specific electronic device on the AR view to communicate the selected content item to the specific electronic device among the identified one or more other electronic devices. A video component of a media item may be communicated to the second electronic device and an audio component of the media item (same media item) may be communicated to a third electronic device of the identified one or more other electronic devices based on a user input (or action) on the generated AR view on the first electronic device. One or more operations as discussed above, such as the selection of the content item and/or dragging of the selected content items towards a specific electronic device on the AR view to initiate communication, may occur based on user action(s) and/or input.

In accordance with an embodiment, the device settings may be set for a plurality of electronic devices connected to the wireless communication network. The plurality of electronic devices may include the one or more other electronic devices. The device settings may be set based on a user-preference associated with an operation to be performed on the plurality of electronic devices and/or a device-type of each of the plurality of electronic devices. The device settings may be dynamically updated based on a temporal analysis of operations previously performed with respect to the plurality of electronic devices by application of a machine learning technique.

In accordance with an embodiment, a specific device setting may be selected from the device settings to control the second electronic device. The specific device setting may be selected based on a current operation state, a data type of a content item to be communicated, and/or one or more compatible content items or control functions supported by the second electronic device. The second electronic device of the identified one or more other electronic devices may be controlled by the first electronic device further based on control information retrieved from the wireless communication network.

In accordance with an embodiment, the first electronic device may be controlled to display visually perceptible graphical effects on the AR view to indicate continuous transfer of data from the first electronic device to the one or more other electronic devices. The display of visually perceptible graphical effects may be performed in a real-time or near real-time in accordance with the type of data that is communicated.

In accordance with an embodiment, a list of compatible media types may be identified for each of the identified one or more other electronic devices based on control information retrieved from the wireless communication network. The control information may include device specification information, a device-type, and/or mapping information of one or more visual cues with a corresponding unique device identifier of each connected device in the wireless communication network. In accordance with an embodiment, the wireless communication network may be a wireless local area network or other wireless communication network.

FIG. 1 is a block diagram that illustrates a network environment for data communication based on image processing, in accordance with an embodiment of the disclosure. With reference to FIG. 1, there is shown a network environment 100. The network environment 100 may include a first electronic device 102 and one or more other electronic devices 104, such as a second electronic device 104a, a third electronic device 104b and a fourth electronic device 104c. There is further shown a wireless communication network 106, a User Interface (UI) 108, and one or more users, such as a user 110.

In accordance with an embodiment, the first electronic device 102 may be connected to the wireless communication network 106. The one or more other electronic devices 104 may also be connected to the wireless communication network 106. The first electronic device 102 may be associated with the user 110.

The first electronic device 102 may comprise suitable logic, circuitry, interfaces, and/or code that may be configured to control the one or more other electronic devices 104 that may be displayed on a viewfinder of the UI 108 rendered on the first electronic device 102. The first electronic device 102 may be further configured to store an image-capturing application. The image-capturing application may render the UI 108 on the first electronic device 102. The first electronic device 102 may correspond to an Internet-of-Things (IoT) device with an in-built image-capturing unit. Examples of the first electronic device 102 may include, but are not limited to, a smartphone, a wearable device, such as a smart-glass or a smartwatch, ma camera, a tablet computer, a laptop, and/or a portable electronic device with an inbuilt camera.

The one or more other electronic devices 104 may comprise suitable logic, circuitry, interfaces, and/or code that may be configured to communicate control information to the first electronic device 102 via the wireless communication network 106. The one or more other electronic devices 104 may correspond to one or more other IoT devices connected to the wireless communication network 106. Examples of the one or more other electronic devices 104 may include, but are not limited to, a television, a speaker system, a car info-entertainment system, a smartphone, a laptop, an IoT device, such as lighting unit, a household consumer electronic appliance, and/or other IoT compatible electronic devices.

The wireless communication network 106 may include a medium through which the first electronic device 102 may communicate with one or more other electronic devices 104, such as the second electronic device 104a, the third electronic device 104b, and the fourth electronic device 104c. Examples of the wireless communication network 106 may include, but are not limited to, a Digital Living Network Alliance (DLNA) based network, a wireless local area network (WLAN), the Internet, or other wireless communication networks. Various devices in the network environment 100 may be configured to connect to the wireless communication network 106, in accordance with various wireless communication protocols. Examples of such wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, such as Long Term Evolution (LTE), and/or Bluetooth (BT) communication protocols.

The UI 108 may be an application interface rendered on a display screen of the first electronic device 102. The UI 108 may comprise one or more UI elements that may enable the user 110 to control one or more other electronic devices 104. The UI 108 may be further configured to display content items to be transmitted to the one or more other electronic devices 104. The UI 108 may be adapted to display an augmented reality (AR) view on the first electronic device 102. The UI 108 may be adapted to display one or more graphical controls on the AR view in accordance with a device-type of each of the one or more other electronic devices 104.

In operation, the user 110 may provide an input at the first electronic device 102, via the UI 108. In response to the input received from the user 110, the first electronic device 102 may be configured to display a viewfinder on at least a portion of the UI 108 to enable capture of one or more images or video by use of the image-capturing unit of the first electronic device 102. The user 110 may then point the image-capturing unit of the first electronic device 102 towards the one or more other electronic devices 104 to visualize the one or more other electronic devices 104 via the viewfinder of the UI 108.

The first electronic device 102 may be configured to control display of an image on the first electronic device 102. The image may include the one or more other electronic devices 104 based on a current field-of-view (FOV) of the image-capturing unit of the first electronic device 102. In accordance with an embodiment, the first electronic device 102 may be configured to detect a location of the first electronic device 102 and/or an orientation of the first electronic device 102 with respect to the one or more other electronic devices 104. Further, a distance of the one or more other electronic devices 104 from the first electronic device 102 that displays the image may be determined.

In accordance with an embodiment, the first electronic device 102 may be configured to detect the one or more other electronic devices 104 in the displayed image based on one or more image-processing techniques. The first electronic device 102 may be configured to detect one or more visual cues associated with the one or more other electronic devices 104 in the displayed image. The one or more visual cues may be a device mark, a device texture, a shape, a size, a device configuration, and/or other device identifiers.

The first electronic device 102 may be configured to retrieve an identity parameter associated with the one or more other electronic devices 104 from the wireless communication network 106. The identity parameter of the one or more other electronic devices 104 may correspond to an Internet Protocol (IP) address, a Media Access Control (MAC) address, a unique device identifier, and/or a Service Set Identifier (SSID). The identity parameter associated with a plurality of electronic devices may be pre-mapped with a corresponding unique device identifier of each connected device in the wireless communication network 106. The plurality of electronic devices connected in the wireless communication network 106 may include the one or more other electronic devices 104 and the first electronic device 102. The identity parameter associated with each of the detected one or more visual cues in the displayed image may be retrieved from the wireless communication network 106. The mapping information may be pre-stored in the first electronic device 102 or retrievable from the wireless communication network 106. In certain scenarios, new devices may be added (communicatively coupled) to the wireless communication network 106. In such scenarios, identity parameter associated with such new devices may also be retrieved. The mapping information for such devices may be dynamically updated in the wireless communication network 106. Thus, both pre-mapped devices and the newly added devices to the wireless communication network 106 may be functional to enable retrieval of corresponding identity parameter(s).

In accordance with an embodiment, the one or more other electronic devices 104 may be identified by the first electronic device 102 based on at least the retrieved identity parameter associated with the one or more other electronic devices 104. The first electronic devices may be configured to establish a connection with the identified one or more other electronic devices 104 in the wireless communication network 106, based on the identity parameter.

In accordance with an embodiment, the first electronic device 102 may be configured to identify a device-type of the one or more other electronic devices 104. The device-type may be identified based on the detected visual cues and the retrieved identity parameter. The device-type may be further identified or validated based on the detected location of the first electronic device 102 with respect to the one or more other electronic devices 104. For instance, each of the plurality of electronic devices may occupy a certain known position in a home space. Thus, an indoor positioning of the first electronic device 102 may indicate its proximity to certain electronic devices for the detected location.

In accordance with an embodiment, the device-type may be further identified based on the detected orientation of the first electronic device 102 that may indicate a direction of pointing of the image-capturing unit of the first electronic device 102 towards the one or more other electronic devices 104. The device-type may be further identified based on a distance of the one or more other electronic devices 104 from the first electronic device 102. For example, when the one or more other electronic devices 104 occupy a large area in the displayed image on the UI 108, it may indicate that the one or more other electronic devices 104 are located in close proximity to the first electronic device 102. The large area may be an area greater than a preset threshold area on the UI 108. Similarly, when the one or more other electronic devices 104 occupy a small area in the displayed image on the UI 108, it may indicate that the one or more other electronic devices 104 are distantly located from the first electronic device 102. The small area may be an area less than a preset threshold area on the UI 108.

In accordance with an embodiment, device settings may be set for a plurality of electronic devices connected to the wireless communication network 106. The plurality of electronic devices may include the one or more other electronic devices 104. The device settings may be set based on a user-preference associated with an operation to be performed by each of the plurality of electronic devices and/or a device-type of each of the plurality of electronic devices. The device settings may be dynamically updated based on a temporal analysis of operations previously performed with respect to the plurality of electronic devices. The update may be performed by application of a machine learning technique.

In accordance with an embodiment, the first electronic device 102 may be configured to control a desired electronic device, such as the second electronic device 104a, from the identified one or more other electronic devices 104 based on the device settings associated with the identified one or more other electronic devices 104. The first electronic device 102 may be configured to select a specific device setting from device settings for the control of the second electronic device 104a. The selection may be performed based on the identified device-type, a current FOV of the image-capturing unit as displayed on the UI 108, and/or a current operation state of the identified one or more other electronic devices 104 that may be displayed in the current FOV (or image) on the UI 108. For example, the fourth electronic device 104c may be in the current FOV as captured by the image-capturing unit of the first electronic device 102. An image that may include only the fourth electronic device 104c of the one or more other electronic devices 104. The device-type of the fourth electronic device 104c may be identified as lighting device and the operation state of the third electronic device 104b may be determined to be in "OFF"

state. Thus, the control in this example may be to change the current state of the third electronic device 104b, such as to communicate a control command to the third electronic device 104b to switch "ON" the third electronic device 104b. Similarly, if the device-type is identified as a media renderer, such as for the second electronic device 104a, and the current state of the second electronic device 104a (a media renderer) is determined to be in "ON" state, a corresponding action may be taken by the first electronic device 102. For example, one or more content items compatible to the second electronic device 104a and/or control functions supported by the second electronic device 104a, may be displayed on the first electronic device 102, via the UI 108.

In accordance with an embodiment, the first electronic device 102 may be configured to generate and display an AR view on the first electronic device 102, via the UI 108. The AR view displayed on the first electronic device 102 may comprise a FOV of the one or more other electronic devices 104, one or more graphical controls associated with the identified one or more other electronic devices 104 displayed within the FOV, and/or one or more content items compatible with the identified device-type of the identified one or more other electronic devices 104. The graphical controls may be generated on the AR view according to the device-type of each of the identified one or more other electronic devices 104 displayed within the FOV of the image-capturing unit of the first electronic device 102. The FOV may be displayed on a certain portion of the UI 108, such as first portion of the UI 108. The FOV may correspond to the displayed image.

In accordance with an embodiment, the one or more other electronic devices may be controlled by a selection of the displayed graphical controls on the UI 108. In accordance with an embodiment, the first electronic device 102 may be configured to display the image of the one or more other electronic devices 104 on the first portion of the UI 108. In accordance with an embodiment, various selection operations, such as selection of an object, electronic device, or graphical controls may be performed using a wearable device or a smartglass. On a second portion of the UI 108, the first electronic device 102 may be configured to display a plurality of icons or selectable links. The plurality of icons or selectable links may correspond to one or more content items compatible with the device-type or one or more control functions supported by the identified one or more other electronic devices 104, such as the second electronic device 104a, to which the content item is to be transmitted. The first electronic device 102 may be configured to select a specific electronic device (such as the second electronic device 104a) from the identified one or more other electronic devices 104 based on the content item to be communicated from the first electronic device 102 to the selected electronic device.

In accordance with an embodiment, the user 110 may select a content item from a list of compatible content items displayed on the first electronic device 102. The user 110 may drag the selected content item towards a specific electronic device displayed in the FOV on the AR view to communicate the selected content item to the specific electronic device among the identified one or more other electronic devices 104. For instance, the first electronic device 102 may be configured to communicate a video component of a content item compatible with the second electronic device 104a and an audio component of the content item to the third electronic device 104b of the identified one or more other electronic devices 104 using the generated AR view on the first electronic device 102. Such decision for separation of the audio component and video component from a single content item (such as a movie) may occur dynamically based on a user action or input. Thus, a user, such as the user 110, may decide whether to perform the separation or not. An example of the bifurcated transmission of audio and video component of the same media item is illustrated and described in FIGS. 3B and 3C.

Figure 2:
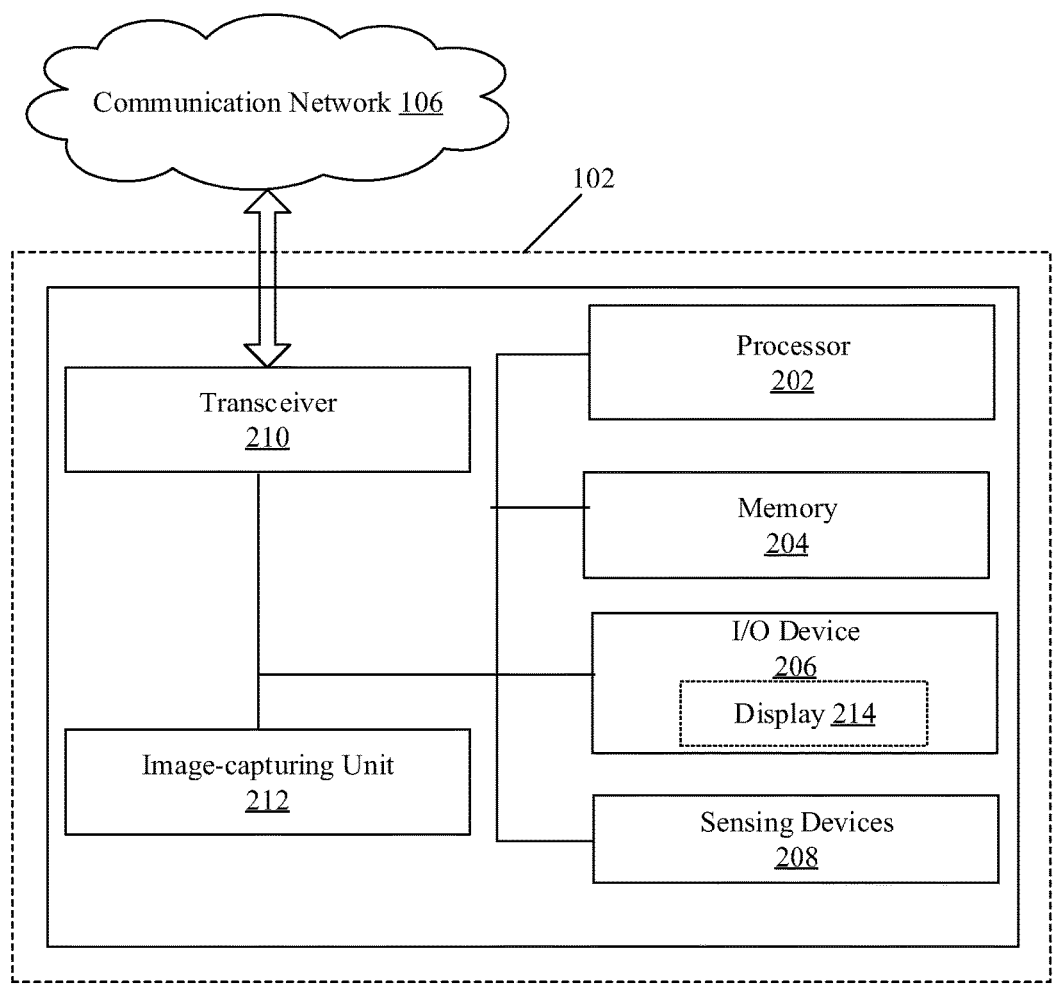
FIG. 2 is a block diagram that illustrates an exemplary electronic device, in accordance with an embodiment of the disclosure.

FIG. 2 is a block diagram that illustrates an exemplary electronic device, in accordance with an embodiment of the disclosure. FIG. 2 is explained in conjunction with elements from FIG. 1. With reference to FIG. 2, there is shown the first electronic device 102. The first electronic device 102 may comprise one or more processors, such as a processor 202, a memory 204, one or more input/output (I/O) devices, such as I/O device 206, a sensing device 208, a transceiver 210, and an image-capturing unit 212. The I/O device 206 may include a display 214. With reference to FIG. 2, there is further shown the wireless communication network 106 of FIG. 1.

The processor 202 may be communicatively coupled to the memory 204, and the I/O device 206, the sensing device 208, the transceiver 210, and the image-capturing unit 212. The transceiver 210 may be configured to communicate with the plurality of electronic devices, such as the identified one or more other electronic devices 104, via the wireless communication network 106.

The processor 202 may comprise suitable logic, circuitry, interfaces, and/or code that may be configured to execute a set of instructions stored in the memory 204. The processor 202 may be implemented based on a number of processor technologies known in the art. Examples of the processor 202 may be an X86-based processor, X86-64-based processor, a Reduced Instruction Set Computing (RISC) processor, an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits.

The memory 204 may comprise suitable logic, circuitry, and/or interfaces that may be configured to store a set of instructions executable by the processor 202. The memory 204 may be configured to store a database, which may include device-types of the plurality of electronic devices associated with their corresponding visual cues. The memory 204 may be further configured to store the device settings for the plurality of electronic devices connected to the wireless communication network 106. The device-types may be stored in an associative relationship with corresponding visual cues, list of compatible content items, functions supported and/or device settings of the plurality of electronic devices. The plurality of electronic devices may include the one or more other electronic devices 104. The memory 204 may be further configured to store operating systems and associated applications. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may comprise suitable logic, circuitry, interfaces, and/or code that may be configured to receive an input from and provide an output to the user 110. The I/O device 206 may include various input and output devices that may be configured to facilitate a communication between the processor 202 and the user 110. Examples of the input devices may include, but are not limited to, a button on the first electronic device 102 to activate the image-capturing unit 212, a software button on the UI 108, the image-capturing unit 212, a camcorder, a touch screen, a microphone, a motion sensor, and/or a light sensor. Examples of the output devices may include, but are not limited to, the display 214, a projector screen, and/or a speaker.

The sensing device 208 may comprise one or more sensors that include a suitable logic, circuitry, interfaces, and/or code to detect physical or quantitative attributes and provide corresponding output as sensor data. The physical or quantitative attributes may include, but are not limited to, orientation, motion, contact, proximity, geo-magnetic field, indoor positioning, and/or ambient lighting. The one or more sensors in the sensing device 208 may be configured to detect an orientation and a geo-location of the first electronic device 102. The one or more sensors in the sensing device 208 may be further configured for tap detection and/or gesture detection. The one or more sensors in the sensing device 208 may be further configured to aid in controlling of the one or more other electronic devices 104, such as the second electronic device 104a and the third electronic device 104b, based on the input detected by the sensing device 208. Examples of the one or more sensors may include, but are not limited to, an accelerometer, a global positioning system (GPS) sensor, an indoor positioning system, a compass or magnetometer, an ambient light sensor, a tricorder, a gyroscope, a proximity sensor, an image sensor, a lux meter, a touch sensor, and/or an infrared sensor.

The transceiver 210 may comprise suitable logic, circuitry, interfaces, and/or code that may be configured to communicate with the plurality of electronic devise, such as the identified one or more other electronic devices 104, via the wireless communication network 106 (as shown in FIG. 1). The transceiver 210 may implement known technologies to support wireless communication of the first electronic device 102 with the wireless communication network 106. The transceiver 210 may include, but is not limited to, an antenna, a radio frequency (RF) transceiver, one or more amplifiers, a tuner, one or more oscillators, a digital signal processor, a coder-decoder (CODEC) chipset, a GSM/GPRS module, and/or a local buffer.

The transceiver 210 may communicate via wireless communication with the wireless communication network 106. The wireless communication may use one or more of the communication standards, protocols and technologies, such as Bluetooth, Wireless Fidelity (Wi-Fi) (such as various IEEE 802.11 standards, IEEE 802.11a, IEEE 802.11b, IEEE 802.11g and/or IEEE 802.11, IEEE 802.11n), voice over Internet Protocol (VoIP), Wi-MAX, a protocol for email, instant messaging, and/or Short Message Service (SMS), the Internet, Message Queue Telemetry Transport (MQTT), Extensible Messaging and Presence Protocol (XMPP), Data Distribution Service (DDS), Advanced Message Queuing Protocol (AMQP), Constrained Application Protocol (CoAP), and/or cellular communication protocols.

The image-capturing unit 212 may comprise suitable logic, circuitry, interfaces, and/or code that may be configured to capture one or more images, such as the image that includes the one or more other electronic devices 104. The image-capturing unit 212 may refer to an in-built camera or an image sensor of the first electronic device 102, such as a smartphone. The image-capturing unit 212 may be configured to store the visual cues of the identified one or more other electronic devices 104 in a local buffer and/or the memory 204, under the control of the processor 202. In accordance with an embodiment, the visual cues may be extracted from the displayed image and identified based on image processing techniques.

The display 214 may comprise suitable logic, circuitry, interfaces, and/or code that may be configured to render the UI 108 of the first electronic device 102. The display 214 may be realized through several known technologies, such as Cathode Ray Tube (CRT) based display, Liquid Crystal Display (LCD), Light Emitting Diode (LED) based display, Organic LED display technology, Retina display technology, and/or the like. In accordance with an embodiment, the display 214 may be capable of receiving input from the user 110. In such a scenario, the display 214 may be a touch screen that enables the user 110 to provide the input. The touch screen may correspond to at least one of a resistive touch screen, a capacitive touch screen, or a thermal touch screen. In accordance with an embodiment, the display 214 may receive the input through a virtual keypad, a stylus, a gesture-based input, and/or a touch-based input. In such a case, the input device may be integrated within the display 214. In accordance with an embodiment, the first electronic device 102 may include a secondary input device apart from the display 214 that may be a touch-based display screen.

In operation, the processor 202 may be configured to detect an orientation or a direction of pointing of the image-capturing unit 212 of the first electronic device 102. The user 110 may point the image-capturing unit 212 of the first electronic device 102 to capture a field-of-view (FOV) that may include the one or more other electronic devices 104 within the FOV. The processor 202 may be configured to control display of an image on the first electronic device 102. The image may include the one or more other electronic devices 104 based on the current FOV of the image-capturing unit 212 of the first electronic device 102. The processor 202 may be configured to identify the one or more other electronic devices 104 displayed in the displayed image (or the FOV). The recognition process may be initiated when the user 110 continues to hold or point the image-capturing unit 212 to capture the FOV for a pre-specified duration. The processor 202 may be configured to identify the one or more other electronic devices 104 based on at least the identity parameter associated with the one or more other electronic devices 104. The identity parameter may be retrieved from the wireless communication network 106, via the transceiver 210.

In accordance with an embodiment, the processor 202 may be configured to identify the device-type based on image processing, such as detection of visual cues (as discussed in FIG. 1), the retrieved identity parameter or a location, the detected orientation or a distance of the one or more other electronic devices 104 from the first electronic device 102. The device-type for each of the plurality of electronic devices that may include the one or more other electronic devices 104, may be pre-stored in a database. In the database, the device-type may be mapped with corresponding one or more visual cues in an associated relationship.

In accordance with an embodiment, one or more device settings may be set for each of the plurality of electronic devices connected to the wireless communication network 106. The plurality of electronic devices may include the one or more other electronic devices 104. The device settings may be set based on a user-preference associated with an operation to be performed by each of the plurality of electronic devices and/or a device-type of each of the plurality of electronic devices. The configuration of the one or more device settings may be a one-time activity.

In accordance with an embodiment, the processor 202 may be configured to dynamically generate one or more device settings for each of the plurality of electronic devices as recommended device settings. The one or more device settings for each of the plurality of electronic devices may be generated based one or more criteria associated with each of the plurality of electronic devices. The one or more criteria may include the identified device-type and/or control functions supported by each of the plurality of electronic devices, such as the identified one or more other electronic devices 104. The user 110 may then select one of the recommended device settings to be set for a specific device or a number of devices that may be classified under a particular category of devices, such as the device-type. The selected device setting(s) may then be further configured or changed (a fine tuning) as per a user-preference of the user 110. This may reduce time used to set or configure the one or more device settings.

In accordance with an embodiment, the one or more device settings may be dynamically updated based on a temporal analysis of operations previously performed with respect to the plurality of electronic devices. The update may be performed by application of a machine learning technique. The one or more device settings of the plurality of electronic devices connected to the wireless communication network 106 may be stored in the memory 204, or at another network device connected to the wireless communication network 106. The one or more device settings of the plurality of electronic devices may be set and applied by the processor 202 under different operational scenarios as per processing of the current FOV or displayed image on the first electronic device 102.

In accordance with an embodiment, the processor 202 may be configured to control the identified one or more other electronic devices 104 based on the device settings associated with the identified one or more other electronic devices 104. For example, a specific IoT device, such as the second electronic device 104a, of the identified one or more other electronic devices 104 may be controlled remotely via the wireless communication network 106.

In accordance with an embodiment, the processor 202 may be configured to select a specific device setting from the pre-stored device settings to control the second electronic device 104a. The control may be performed based on the identified device-type, a current operation state of the second electronic device 104a, and/or control functions supported by the second electronic device 104a. The control functions supported by the second electronic device 104a may be retrieved from the wireless communication network 106 or directly from the second electronic device 104a.

In a first example, a device setting-1 may be selected and applied in a scenario where the processor 202 may identify that the second electronic device 104a and the third electronic device 104b are captured within a FOV and displayed in the image rendered on the display 214, via the UI 108. The device setting-1 for such scenario may correspond to determination of compatible content items or control menu (such as control buttons) as per device-type, and communication of a first component of a selected media item to the second electronic device 104a and a second component of the same media item to the third electronic device 104b. For example, the media item may be divided into a video component and an audio component. The video component may be casted on a video renderer (such as the second electronic device 104a) and the audio component may be casted on an audio renderer (such as the third electronic device 104b).

In a second example, a device setting-2 may be selected and applied in a scenario where the processor 202 may identify that a single device, such as the second electronic device 104a, may be captured within the FOV and displayed in the image rendered on the display 214, via the UI 108. The device setting-2 for such scenario may correspond to determination of compatible content items or control menu as per device-type, and communication of a selected content item having both the video component and the audio component to the second electronic device 104a. The processor 202 may detect and retrieve certain content items stored either in the memory 204 or from the wireless communication network 106 that may be compatible to be communicated to the second electronic device 104a, based on identification of device-type of the second electronic device 104a. For example, a media item may be a video having both video component and audio component. The media item may be casted on the second electronic device 104a (such as a smart TV) that may play both the video component and the audio component.

In a third example, a device setting-3 may be selected and applied in a scenario where the processor 202 may recognize that only the third electronic device 104b is captured within the FOV and displayed in the image rendered on the display 214, via the UI 108. The device setting-3 for such a scenario may be set to communicate the audio component of the media item to the third electronic device 104b. The processor 202 may further detect that the content item to be communicated to the third electronic device 104b is compatible to play an audio component of the content item based on identification of device-type. For example, a media item may be a video having both video component and audio component. The audio component may be casted on the third electronic device 104b (such as a music system or a home theatre) that may be detected to be compatible with the audio component. In accordance with an embodiment, the video component may be displayed on the first electronic device 102.

In a fourth example, a device setting-4 may be selected and applied in a scenario where the processor 202 may recognize that the fourth electronic device 104c is captured within the FOV and displayed in the image rendered on the display 214, via the UI 108. The processor 202 may identify the device-type to be a lighting device. The device setting-4 may correspond to determination of a current operation state of the fourth electronic device 104c, followed by a change in the detected current operation state. The processor 202 may then communicate a control signal to the fourth electronic device 104c to power "ON" the fourth electronic device 104c that may be previously in an "OFF" operation state. Thus, the device settings may be automatically or manually set and updated with different conditions as described above.

It is to be understood that the device settings and conditions described in the above examples are exemplary device settings, and the scope of the disclosure may not be limited to the disclosed device settings or conditions for their application. Various device settings may be set for various devices, as per the device-type and other criteria as discussed above. Further device-type may not be limited to a lighting device, a media renderer, and/or an audio player. Other device-type, such as a heating device, a cooling device, or a user-specified device-type or device category may be set and utilized for the control purpose. In accordance with an embodiment, the functionalities or operations performed by the first electronic device 102, as described in FIG. 1 may be performed by the processor 202. Other operations performed by the processor 202 may be understood from the description in the FIGS. 3A, 3B, 3C, 4A, 4B, 4C, and 5.

Figure 3A:
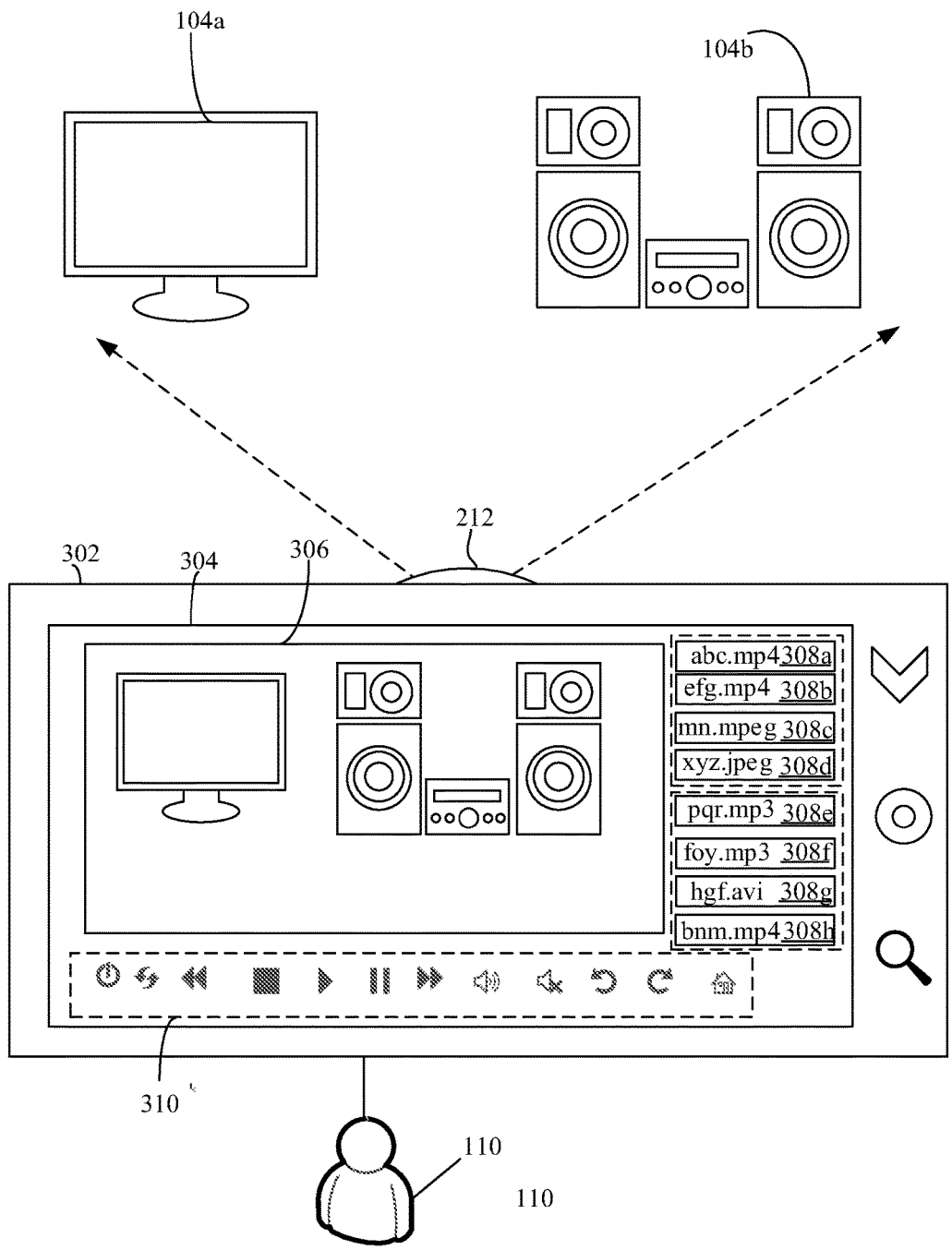
FIGS. 3A, 3B, and 3C, collectively, illustrate a first exemplary scenario for implementation of the disclosed system and method for data communication based on image processing, in accordance with an embodiment of the disclosure.
Figure 3B:
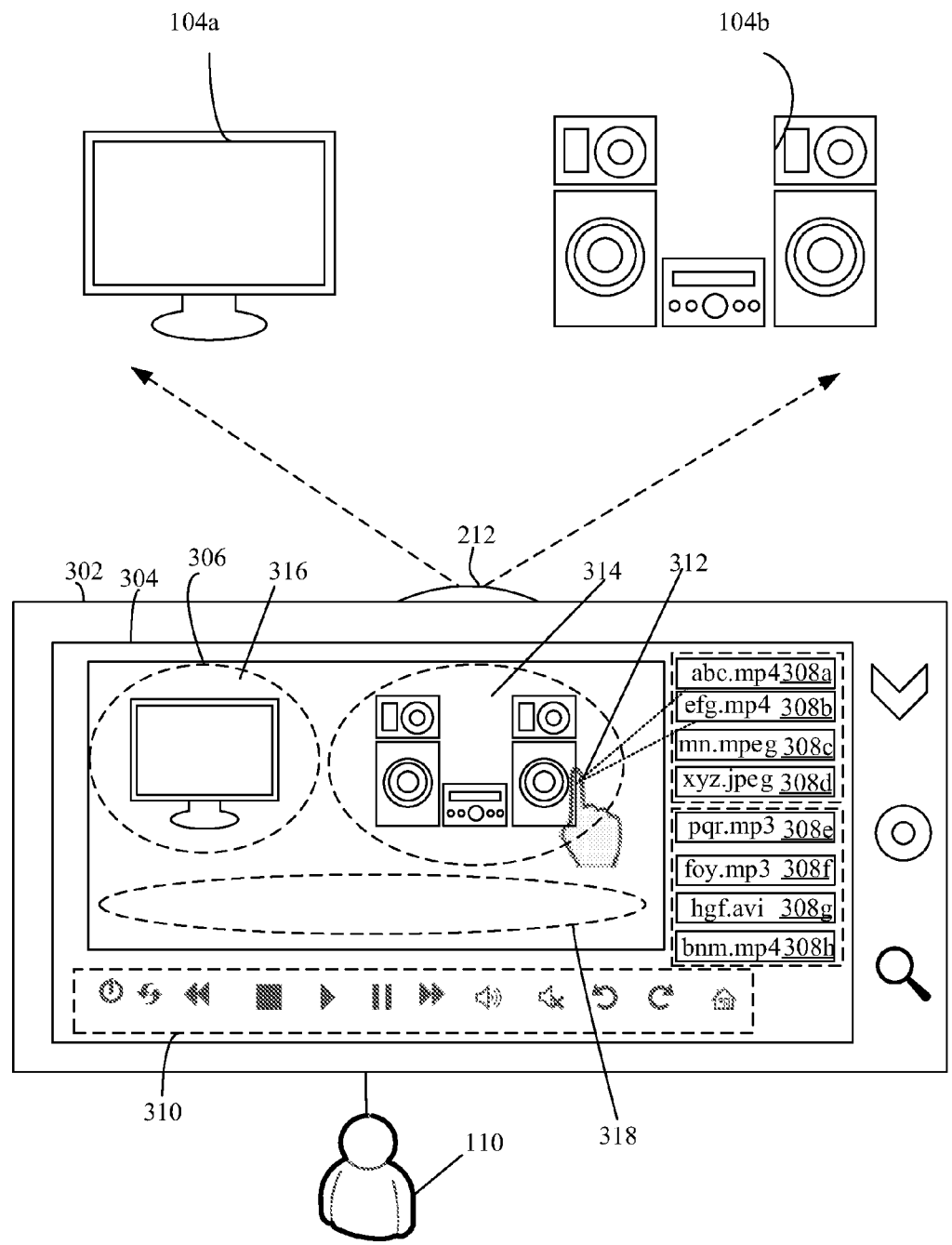
Figure 3C:
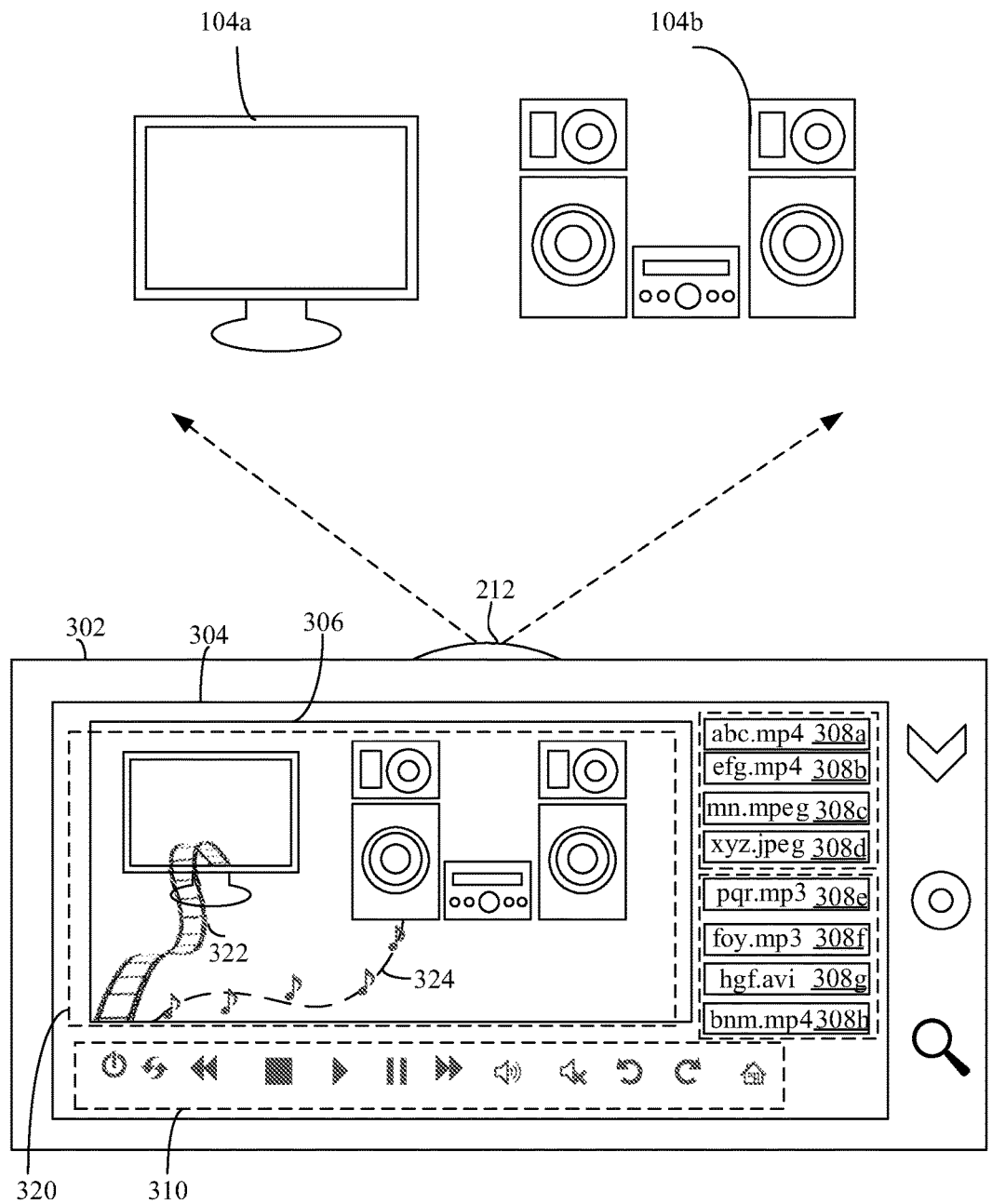

FIGS. 3A, 3B, and 3C illustrate a first exemplary scenario for the implementation of the disclosed system and method for data communication based on image processing, in accordance with an embodiment of the disclosure. FIGS. 3A to 3C have been explained in conjunction with elements from FIG. 1 and FIG. 2. With reference to FIG. 3A, there is shown a smartphone 302, a user interface (UI) 304, a schematic representation of a layout on the UI 304, which comprises a FOV 306, a plurality of icons 308a to 308h, and a first set of control buttons 310, rendered at the UI 304. The plurality of icons 308a to 308h may correspond to the content items compatible with the second electronic device 104a and the third electronic device 104b. There is further shown the second electronic device 104a, the third electronic device 104b, and the image-capturing unit 212 (FIGS. 1 and 2). The user 110 may be associated with the smartphone 302.

In accordance with the first exemplary scenario, the smartphone 302 may have functionalities similar to that of the first electronic device 102. The smartphone 302, the second electronic device 104a, and the third electronic device 104b may correspond to the IoT devices connected to the wireless communication network 106. The UI 304 may correspond to the UI 108 of the first electronic device 102 (FIGS. 1 and 2). The smartphone 302 may be configured to store certain number of the device settings. The user 110 may want to control an IoT device, such as the second electronic device 104a or the third electronic device 104b, from the smartphone 302, such as playing a media item on the desired IoT device.

For the control of the IoT device, identification of the device-type displayed in the FOV 306 and the content items that may be compatible to be played on the identified device-type of the IoT device may be required. Some content item may not be compatible with the second electronic device 104a or the third electronic device 104b. For example, a file with extension .doc may not be compatible with an IoT device, such as the second electronic device 104a, the third electronic device 104b, or a lighting device (such as an IoT light bulb). Hence, the plurality of icons 308a to 308h, as rendered on the smartphone 302, via the UI 304, may correspond to links to retrieve the content items compatible with the identified second electronic device 104a or the third electronic device 104b within the FOV 306.

In operation, the user 110 may point the smartphone 302 towards one or more IoT devices, such as the second electronic device 104a and the third electronic device 104b, connected to the wireless communication network 106, such as a wireless home network. The smartphone 302 may be configured to control display of an image, such as the FOV 306, on a display of the smartphone 302, via the UI 304, as shown.

The smartphone 302 may recognize the second electronic device 104a and the third electronic device 104b in the FOV 306 based on an identity parameter associated with the second electronic device 104a and the third electronic device 104b. The smartphone 302 may identify the second electronic device 104a to be a television (TV), and identify a device-type of the identified second electronic device 104a to be a media renderer capable to play a video or an audio. Based on the recognition, the smartphone 302 may display the plurality of icons 308a to 308h, which may be casted on (or communicated to) the identified second electronic device 104a (the TV).

The smartphone 302 may generate the first set of control buttons 310 in accordance with the identified device-type of the second electronic device 104a and the third electronic device 104b. For instance, the first set of control buttons 310, such as play, stop, pause, rewind, forward operations, may be suitable as per the identified device-type of the second electronic device 104a and the third electronic device 104b. The user 110 may use the generated set of control buttons 310 to control playing of the content items compatible with the identified second electronic device 104a or the third electronic device 104b, by selection of the plurality of icons 308a to 308h.

With reference to FIG. 3B, there is shown a drag operation 312 to depict a sequence of operations of the first exemplary scenario, as described in FIG. 3A. There is further shown a first portion 314, a second portion 316, and a third portion 318 within the FOV 306. In accordance with an embodiment, the user 110 may select the content item, which may be a movie "efg.mp4", shown as the icon 308b. The user 110 may drag the selected content item, such as the icon 308b, towards a specific electronic device displayed in the FOV 306 and drop the content item on the specific electronic device. This may enable the selected content item to be played on the specific electronic device.

For example, the user 110 may select the content item, such as the icon 308b, displayed on the UI 304. The user 110 may then drag (shown as the drag operation 312) the selected icon 308b and drop it on the first portion 314 of the FOV 306 that includes the third electronic device 104b (such as the music system) to play the audio component of the selected content item (the movie "efg.mp4") to be played on the third electronic device 104b. The video component may not be played. In accordance with an embodiment, the video component may be played on the smartphone 302. Further, the user 110, after a certain time interval, may drag the selected icon 308b and further drop it on the second portion 316 of the FOV 306 that includes the second electronic device 104a (such as the TV), as shown. The smartphone 302 may then also communicate the video component of the selected content item (the movie "efg.mp4") to be played on the second electronic device 104a (the TV) while the audio component of the selected content item (the movie "efg.mp4") may be played on the third electronic device 104b (the music system).

In accordance with an embodiment, the user 110 may select the content item, such as the icon 308b, displayed on the UI 304. The user 110 may then drag the selected icon 308b and drop it on the third portion 318 of the FOV 306 that includes both the second electronic device 104a and the third electronic device 104b. The third portion 318 may be a common portion that includes both the second electronic device 104a and the third electronic device 104b or a free portion of the FOV that may not include any identified device. In this case, the smartphone 302 may understand what the next corresponding action is for the smartphone 302 to perform based on the preset device settings. Accordingly, the smartphone 302 may simultaneously communicate the video component of the selected content item (the movie "efg.mp4") to be played on the second electronic device 104a (the TV) and the audio component of the same content item (the movie "efg.mp4") to be played on the third electronic device 104b (the music system).

With reference to FIG. 3C, there is further shown an AR view 320 on the UI 304. In accordance with the first exemplary scenario, the first electronic device 102 may be configured to communicate the content item compatible with the specific electronic device by use of the generated AR view 320 on the smartphone 302. The UI 304 may be configured to display visually perceptible graphical effects, such as arrows, waveforms, symbols, parabolic paths, emoticons, on the AR view 320 to indicate that the content item or a control signal is currently transferred from the smartphone 302 to the specific electronic device. Based on the flow of the visually perceptible graphical effects on the AR view 320, the user 110 may monitor transfer of the data while the data is being transferred.

As discussed in FIG. 3B, when the smartphone 302 communicates the dvideo component of the selected content item (the movie "efg.mp4") to the second electronic device 104a (the TV) and the audio component of the same content item (the movie "efg.mp4") to the third electronic device 104b (the music system), the AR view 320 may be rendered on the UI 304 in the smartphone 302. In the AR view 320, the visually perceptible graphical effects 322 and 324 may be rendered on the UI 304 to indicate a real time transfer of selected content item in accordance to data-type of the content item that is transferred or individual components of the content item currently transferred. For example, a first visually perceptible graphical effect, such as a film strip 322, as shown, may denote transfer of a compatible video component of the selected content item to the second electronic device 104a (such as the TV). A second visually perceptible graphical effect, such as a flow of music tunes 324, as shown, may denote transfer of a compatible audio component of the selected content item to the third electronic device 104b (such as the music system). The AR view 320 with visually perceptible graphical effects, such as the flow of film strip 322 and the music tunes 324, may provide an intuitive experience to a user, such as the user 110, while performing the data communication between the smartphone 302 and the identified electronic devices, such as the second electronic device 104a and the third electronic device 104b.

Figure 4A:
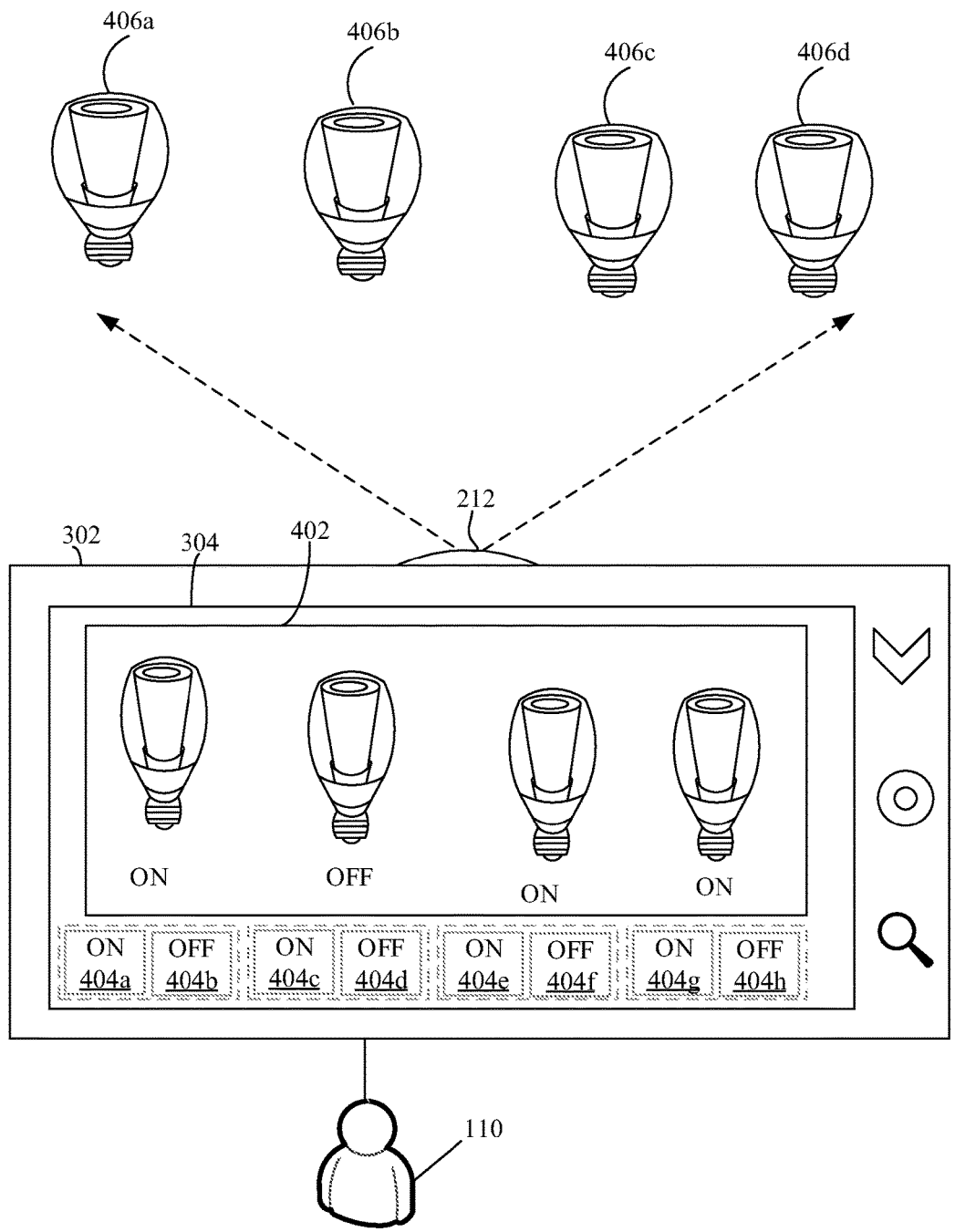
FIGS. 4A, 4B, and 4C, collectively, illustrate a second exemplary scenario for implementation of the disclosed system and method for data communication based on image processing, in accordance with an embodiment of the disclosure.
Figure 4B:
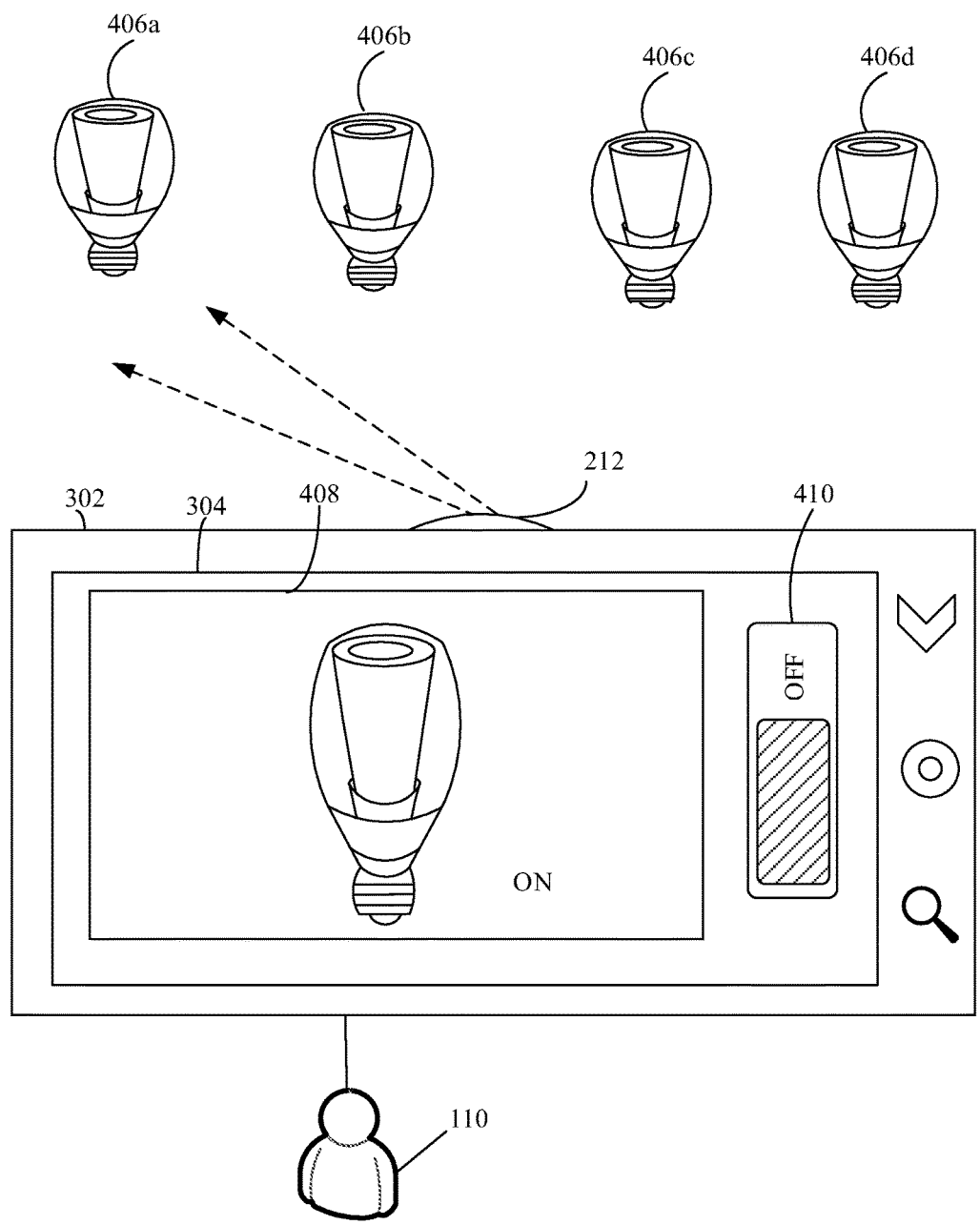
Figure 4C:
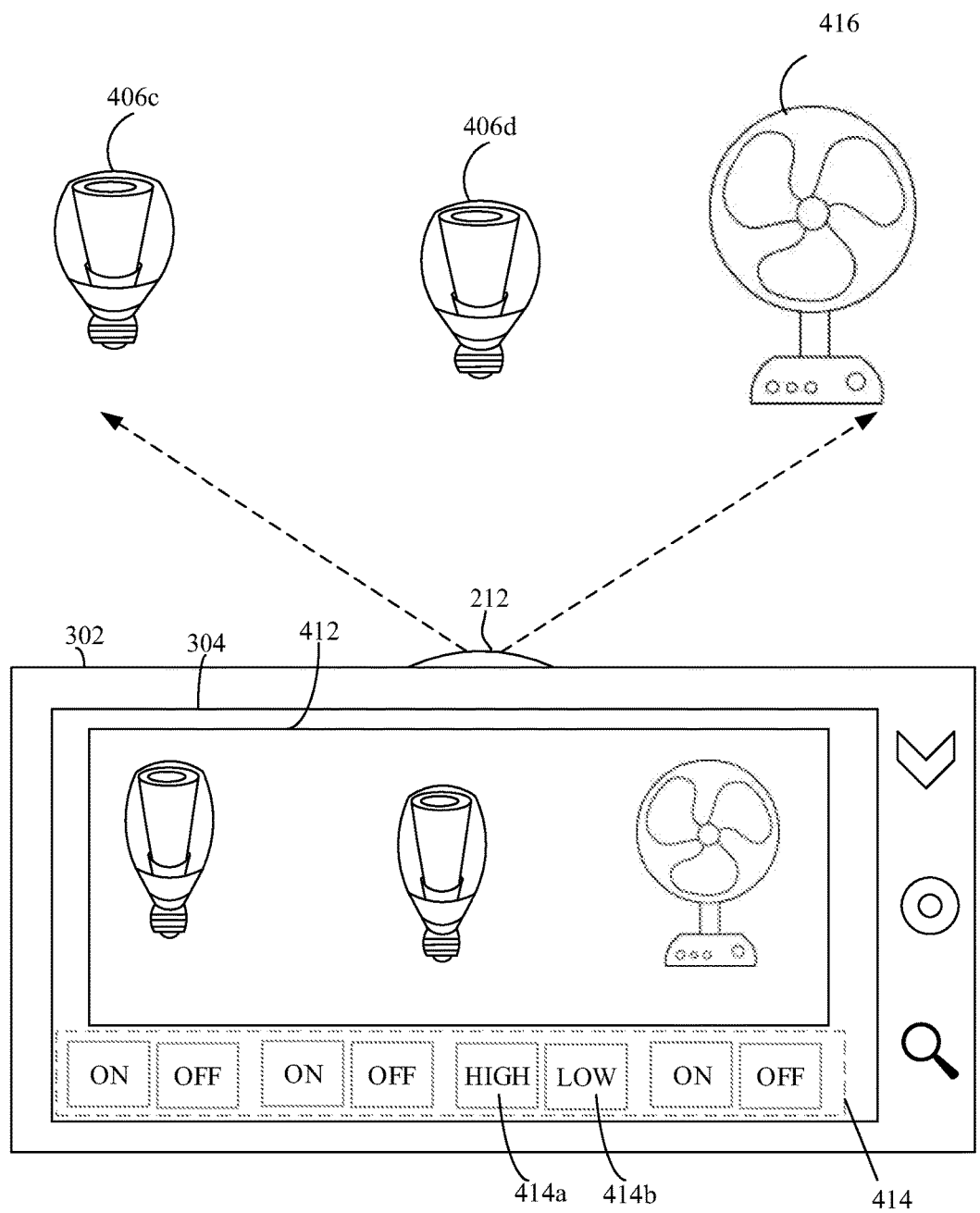

FIGS. 4A, 4B and 4C, collectively, illustrate a second exemplary scenario for the implementation of the disclosed system and method for data communication based on image processing, in accordance with an embodiment of the disclosure. FIGS. 4A, 4B, and 4C have been explained in conjunction with elements from FIGS. 1, 2, 3A, 3B, and 3C. With reference to FIG. 4A, there is shown the smartphone 302, the UI 304, a schematic representation of a layout on the UI 304, which comprises a first FOV 402, and a plurality of control buttons 404a to 404h. There is further shown a plurality of IoT light bulbs 406a to 406d. The plurality of control buttons 404a to 404h may be a second set of control buttons different from the first set of control buttons 310, as described in the FIGS. 3A to 3C.

In accordance with the second exemplary scenario, the plurality of IoT light bulbs 406a to 406d may correspond to the one or more other electronic devices 104. The plurality of IoT light bulbs 406a to 406d and the smartphone 302 may be connected to the wireless home network, such as the wireless communication network 106. The IoT light bulbs 406a, 406c and 406d may be in "ON" operation state, whereas the IoT light bulb 406b may be in "OFF" operation state.

In operation, the user 110 may point the image-capturing unit 212 of the smartphone 302 towards the plurality of IoT light bulbs 406a to 406d. A simple pointing of the smartphone 302 may automatically change the current operation state of the IoT light bulb 406b such that the IoT light bulb 406b is turned "ON", while other IoT light bulbs 406a, 406c, and 406d, may continue to be in "ON" operation state. The smartphone 302 may intelligently take an action to selectively control the IoT light bulb 406b from the plurality of IoT light bulbs 406a to 406d based on a selected device setting associated with the identified plurality of IoT light bulbs 406a to 406d.

For example, based on the image processing of the displayed image that corresponds to the first FOV 402, the smartphone 302 may detect one or more visual cues, such as texture, shape, size, and/or a device mark, of the detected plurality of IoT light bulbs 406a to 406d in the displayed image. The detected one or more visual cues may then be used to retrieve an identity parameter associated with the detected plurality of IoT light bulbs 406a to 406d from the wireless home network, such as the wireless communication network 106. The smartphone 302 may identify the detected plurality of IoT light bulbs 406a to 406d based on the retrieved identity parameter, such as a unique device identifier, associated with the plurality of IoT light bulbs 406a to 406d. In accordance with an embodiment, the position of the smartphone 302 and IoT devices, such as the IoT light bulbs 406a to 406d, may be further used as one of the parameters to identify the IoT device(s) to be controlled. The sensing devices 208, such as gyroscope, GPS, compass, accelerometer, depth sensor, and the like, may be used to identify the position of the smartphone 302.

The smartphone 302 may be configured to control one or more of the identified plurality of IoT light bulbs 406a to 406d based on device settings associated with the identified plurality of IoT light bulbs 406a to 406d. When the device-type of each of the plurality of IoT light bulbs 406a to 406d is identified as lighting device in the displayed image and the operation state of one or more of the plurality of IoT light bulbs 406a to 406d is determined to be in "OFF" state, the control (based on a device setting for lighting device) in this example may be to communicate a control command, via the wireless home network, to the IoT light bulb 406b to power "ON" the IoT light bulb 406b.

In accordance with an embodiment, the user 110 may manually select and change the operation state of the identified plurality of IoT light bulbs 406a to 406d by use of the plurality of control buttons 404a to 404h. The plurality of control buttons 404a to 404h may be generated and displayed on the UI 304, as per the identified device-type and device capability of the plurality of IoT light bulbs 406a to 406d. In accordance with an embodiment, the generation of the plurality of control buttons 404a to 404h may occur after an initial automatic and intelligent change of the operation state of the plurality of IoT light bulbs 406a to 406d have been performed based on the pre-set device settings or machine learning. The plurality of control buttons 408a to 408h may correspond to an "ON" and "OFF" graphical controls to control an operation state of each of the plurality of IoT light bulbs 406a to 406d, as shown. The user 110 may manually select a control button from the plurality of control buttons 404a to 404h to select and change a current operation state of each of the plurality of IoT bulbs 406a to 406d.

In accordance with an embodiment, the pre-set device settings may be reconfigured by the smartphone 302 by use of machine learning based on a temporal analysis of the operations previously performed, such as historical actions taken by the user 110 via the UI 304, with respect to the the plurality of IoT light bulbs 406a to 406d. For example, based on time of present day, the operation state of the IoT bulb 406a may be turned OFF when the time is detected as day time or may be turned ON when the time is detected as night time. In accordance with an embodiment, luminance of the plurality of IoT light bulbs 406a to 406d may also be controlled.

With reference to FIG. 4B, there is further shown a second FOV 408 and a slider control button 410 rendered on the UI 304. The user 110 may point the image-capturing unit 212 of the smartphone 302 towards the IoT light bulb 406*a* such that the current FOV (that is the second FOV 408) including a single device, such as the IoT light bulb 406*a*, as shown. In this case, a simple pointing of the smartphone 302 may automatically change the operation state of the IoT light bulb 406*a*. For example, when a single lighting device is identified in the second FOV 408, the smartphone 302 may be configured to control the identified IoT light bulb 406*a* to power "OFF" the IoT light bulb 406*a* if the IoT light bulb 406*a* is "ON" or vice-versa.

Further, the slider control button 410 may be rendered in accordance with identified device-type and device capability of the device, such as the IoT light bulb 406*a*, in the second FOV 408. The user 110 may provide an input via the UI 304, to slide the slider control button 410 to "OFF" state. The smartphone 302 may then communicate a control command to the IoT light bulb 406*a* to change the current operation state of the IoT light bulb 406*a* to "OFF" operation state.

With reference to FIG. 4C, there is further shown a third FOV 412, a third set of control buttons 414, and a new IoT device, such as a IoT-enabled fan 416, as viewed via a viewfinder of the image-capturing unit 212. The user 110 may point the image-capturing unit 212 of the smartphone 302 towards the IoT light bulbs 406*c* and 406*d* and the IoT-enabled fan 416. Accordingly, an image that corresponds to the third FOV 412 may be displayed on the UI 304, as shown. The smartphone 302 may be configured to generate the third set of control buttons 414, in accordance with the identified device-type and device capability of the devices in the third FOV 412. For example, in addition to the "ON" and "OFF" control buttons generated for the control of the identified IoT light bulbs 406*c* and 406*d*, new control buttons 414*a* and 414*b* (represented as "HIGH" and "LOW") may be generated and rendered on the UI 304 to enable speed regulation of the IoT-enabled fan 416. A selection of the control button 414*a* from the UI 304 may increase the speed of the IoT-enabled fan 416 in real-time. Similarly, a selection of the control button 414*b* from the UI 304 may decrease the speed of the IoT-enabled fan 416. Thus, the smartphone 302 may intelligently control the identified devices in a simplified manner by just pointing of the image-capturing unit 212 of the smartphone 302 towards the identified devices in the wireless home network. Further, an intuitive experience may be provided to the user 110 to effectuate the communication and control via the UI 304 rendered on the smartphone 302.

It should be understood by one skilled in the art that the various embodiments are not limited to specific type of electronic devices, such as the IoT light bulbs 406*a* to 406*d* or the IoT-enabled fan 416. Accordingly, other suitable electronic devices or IoT devices, such as smart microwaves or refrigerators, may be controlled by performing similar operations as described with regards to the second electronic device 104*a*, the third electronic device 104*b*, the IoT light bulbs 406*a* to 406*d*, and/or the IoT-enabled fan 416 without departing from the spirit and scope of the disclosure. Thus, the smartphone 302 may intelligently control the identified devices in a simplified manner by just pointing of the image-capturing unit 212 of the smartphone 302 towards the identified devices in the wireless home network. For example, regulating temperature and time to cook in case of controlling of microwaves, and regulating cooling or power "ON" or "OFF" in case of refrigerators as per identified device type.

Figure 5:
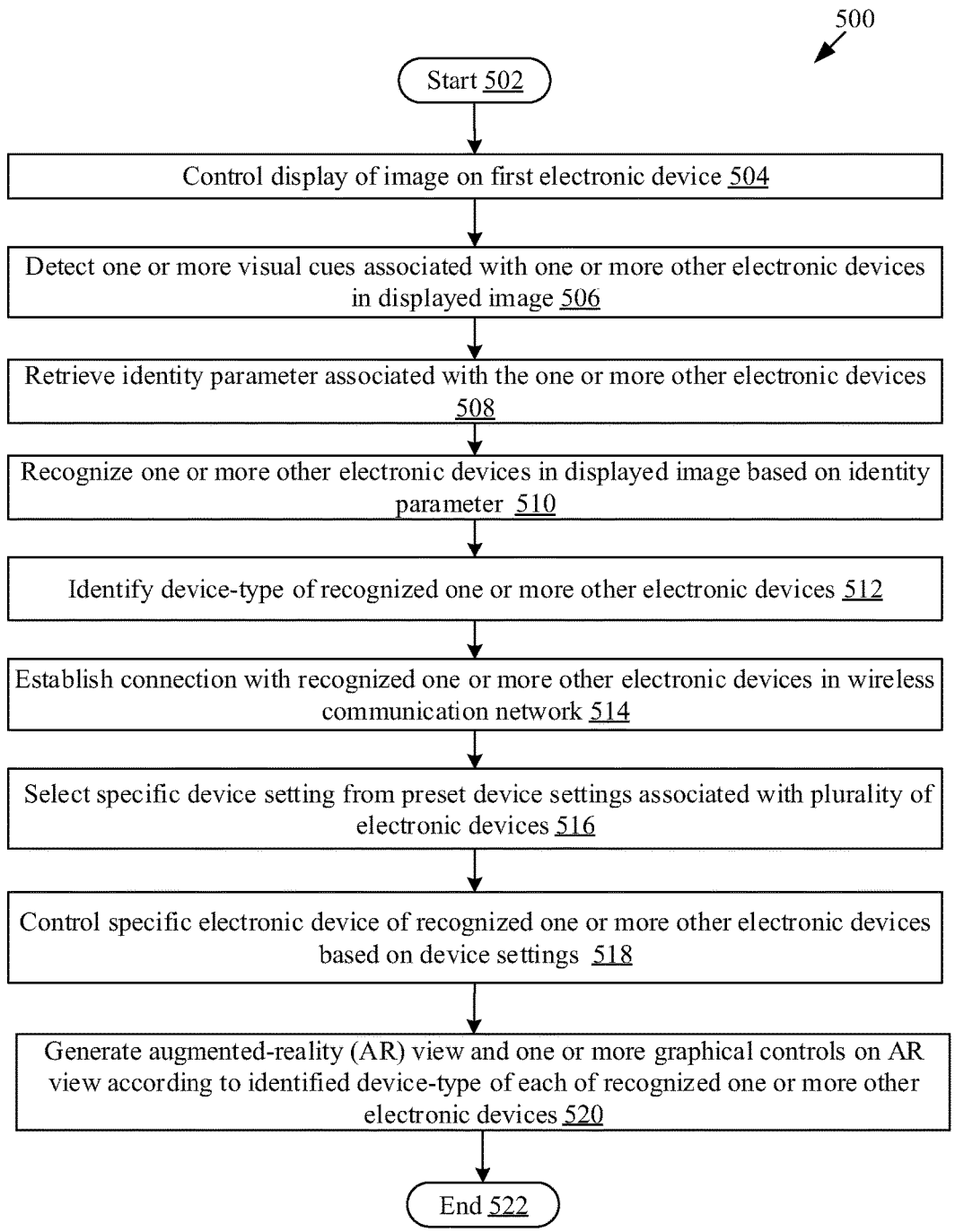
FIG. 5 is a flow chart that illustrates an exemplary method for data communication based on image processing, in accordance with an embodiment of the disclosure.

FIG. 5 is a flow chart that illustrates an exemplary method for data communication based on image processing, in accordance with an embodiment of the disclosure. With reference to FIG. 5, there is shown a flow chart 500. The flow chart 500 is described in conjunction with elements from FIGS. 1, 2, 3A. The method starts at step 502 and proceeds to step 504.

At step 504, display of an image on the first electronic device 102, may be controlled. The image may comprise one or more other electronic devices 104. At step 506, one or more visual cues associated with one or more other electronic devices 104 in the displayed image, may be detected.

At step 508, an identity parameter associated with the one or more other electronic devices 104 may be retrieved from the wireless communication network 106. The identity parameter of the one or more other electronic devices 104 may correspond to the IP address, the MAC address, the unique device identifier, and/or the SSID. The retrieval of the identity parameter may be performed based on pre-mapped data that includes a unique device identifier of each connected device in the wireless communication network 106 in an associative relationship with corresponding one or more visual cues associated with a plurality of electronic devices connected to the wireless communication network 106. The plurality of electronic devices may include the one or more other electronic devices 104. At step 510, the one or more other electronic devices 104, may be identified based on the retrieved identity parameter associated with the one or more other electronic devices 104.

At step 512, a device-type of the identified one or more other electronic devices 104 may be identified. The device-type may be identified based on the detected one or more visual cues, the retrieved identity parameter, a location of the first electronic device 102, an orientation of the first electronic device 102 with respect to the one or more other electronic devices 104, and/or a distance of the one or more other electronic devices 104 from the first electronic device 102 that displays the image. At step 514, a connection with the identified one or more other electronic devices 104 may be established in the wireless communication network 106.

At step 516, a specific device setting from preset device settings associated with the plurality of electronic devices connected to the wireless communication network 106, may be selected. The device settings may be preset based on a user-preference associated with an operation to be performed for the plurality of electronic devices that includes the one or more other electronic devices 104, and/or a device-type of each of the plurality of electronic devices. At step 518, a specific electronic device, such as the second electronic device 104*a*, of the identified one or more other electronic devices 104 may be controlled. The second electronic device 104*a* may be controlled based on the device settings associated with the identified one or more other electronic devices 104. The control of the second electronic device 104*a* or the identified one or more other electronic devices 104 may be based on one or more criteria. The one or more criteria may be the identified device-type, a current operation state, a data-type of a content item to be communicated, one or more compatible content items, and/or control functions supported by the second electronic device 104*a* or the identified one or more other electronic devices 104. The selection of the specific device setting may also be performed based on similar criteria, such as the one or more criteria, discussed above.

At step 520, an augmented-reality (AR) view, such as the AR view 320, may be generated on the first electronic device 102 to enable control of the identified one or more other electronic devices 104. In other words, the AR view 320 may be an intuitive view that may facilitate a user to control the identified one or more other electronic devices 104. However, the actual communication between various devices may occur in the backend and may be based on user action or input for such control. In accordance with an embodiment, the AR view may include a field-of-view (FOV) of the one or more other electronic devices 104, one or more graphical controls associated with the identified one or more other electronic devices 104 that may be displayed within the FOV, and/or one or more content items compatible with the identified device-type of the identified one or more other electronic devices 104. The one or more graphical controls may be generated on the AR view in accordance to the identified device-type of each of the identified one or more other electronic devices 104 within the FOV (a currently displayed FOV or image) for the control. The control may pass to end step 522.

In accordance with an embodiment of the disclosure, a system for data communication based on image processing is disclosed. The system (such as the first electronic device 102 (FIG. 1) may comprise one or more circuits (hereinafter referred to as the processor 202 (FIG. 2)). The processor 202 may be configured to control display of an image on the first electronic device 102. The image may include the one or more other electronic devices 104. The one or more other electronic devices 104 in the displayed image may be identified based on an identity parameter associated with the one or more other electronic devices 104. The second electronic device 104a of the identified one or more other electronic devices 104 may be controlled based on device settings associated with the identified one or more other electronic devices 104.

Various embodiments of the disclosure may provide a non-transitory computer readable medium and/or storage medium, and/or a non-transitory machine readable medium and/or storage medium having stored thereon, a machine code and/or a set of instructions executable by a machine and/or a computer to perform data communication based on image processing. The set of instructions may cause the machine and/or computer to perform the steps that comprise control of an image on the first electronic device 102. The image may include one or more other electronic devices 104 communicatively coupled to the wireless communication network 106. The one or more other electronic devices 104 may be identified in the displayed image based on an identity parameter associated with the one or more other electronic devices 104. An IoT device, such as the second electronic device 104a, of the identified one or more other electronic devices 104 may be controlled based on pre-defined device settings. The pre-defined device settings may be associated with the one or more other electronic devices 104.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that may enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A system for data communication, comprising:
 a first electronic device of a plurality of electronic devices, the first electronic device comprising:
  an image-capturing unit configured to capture an image of at least one second electronic device of said plurality of electronic devices; and
  circuitry configured to:
   control a display device to display said captured image;
   detect, in said displayed image, at least one visual cue corresponding to a third electronic device of said at least one second electronic device;
   retrieve via a wireless communication network, based on said detection of said at least one visual cue, an identity parameter associated with said third electronic device;
   identify, based on said retrieved identity parameter, said third electronic device in said displayed image;
   identify a device-type of said third electronic device, based on at least one of said at least one visual cue or said retrieved identity parameter;
   establish, via said wireless communication network, a communication session between said first electronic device and said identified third electronic device;
   select device settings associated with said identified third electronic device based on said identified device-type of said identified third electronic device;
   generate a user interface corresponding to said third electronic device, based on said selected device settings,
    wherein said generated user interface comprises at least one first graphical element to control said selected device settings;
   update, based on a device capability of said third electronic device to playback at least one data item, said generated user interface to include at least one second graphical element corresponding to said at least one data item;
   control said display device to display said updated user interface; and control, based on a user input on said displayed user interface, at least one of said selected device settings of said third electronic device or said playback of said at least one data item on said third electronic device.

2. The system according to claim 1,
wherein said first electronic device is a first Internet-of-Things (IoT) device with said image-capturing unit, and
wherein said third electronic device is at least one second IoT device, connected to said wireless communication network.

3. The system according to claim 1, wherein said at least one visual cue corresponds to at least one of a device mark, a device texture, a shape, a size, a device configuration, or at least one device identifier.

4. The system according to claim 1, wherein said circuitry is further configured to identify said device-type of said third electronic device, based on at least one of a location of said first electronic device, an orientation of said first electronic device with respect to said third electronic device, or a distance of said third electronic device from said first electronic device.

5. The system according to claim 1, wherein said identity parameter of said third electronic device corresponds to at least one of an Internet Protocol (IP) address, Media Access Control (MAC) address, a unique device identifier, or a Service Set Identifier (SSID).

6. The system according to claim 1, wherein said circuitry is further configured to generate, as said user interface, an augmented-reality (AR) view on said first electronic device to enable control of said identified third electronic device,
wherein said AR view comprises a field-of-view (FOV) of said third electronic device, at least one graphical control associated with said identified third electronic device or at least one content item compatible with said identified third electronic device.

7. The system according to claim 6, wherein said circuitry is further configured to generate said at least one graphical control on said AR view based on said device-type of said identified third electronic device.

8. The system according to claim 6, wherein said circuitry is further configured to:
select a content item of said at least one data item from said AR view on said first electronic device;
detect, a drag operation of said selected content item towards one of said at least one second electronic device, on said AR view; and
communicate, based on said detection of said drag operation, said selected content item to said one of said at least one second electronic device.

9. The system according to claim 1, wherein said circuitry is further configured to:
communicate, based on said user input on said displayed user interface, a video component of a media item to said third electronic device and an audio component of said media item to a fourth electronic device of said at least one second electronic device.

10. The system according to claim 1, wherein said circuitry is further configured to set said device settings based on at least one of a user-preference associated with execution of an operation corresponding to said identified third electronic device or said device-type of said identified third electronic device.

11. The system according to claim 10, wherein said circuitry is further configured to dynamically update, based on a temporal analysis of said execution of said operation and application of a machine learning technique, said device settings.

12. The system according to claim 1, wherein said circuitry is further configured to:
select a specific device setting from said device settings for control of said third electronic device, based on at least one of said device-type, a current operation state of said third electronic device, a data type of said at least one data item, at least one compatible content item, or control functions supported by said third electronic device.

13. The system according to claim 12, wherein said circuitry is further configured to:
retrieve, via said wireless communication network, control information corresponding to said third electronic device; and
control said third electronic device based on retrieved control information.

14. A method for data communication, comprising:
in a first electronic device of a plurality of electronic devices:
capturing an image of at least one second electronic device of said plurality of electronic devices;
controlling, a display device to display said captured image;
detecting, in said displayed image, at least one visual cue corresponding to a third electronic device of said at least one second electronic device;
retrieving via a wireless communication network, based on said detection of said at least one visual cue, an identity parameter associated with said third electronic device;
identifying, based on said retrieved identity parameter, said third electronic device in said displayed image;
identifying a device-type of said third electronic device, based on at least one of said at least one visual cue or said retrieved identity parameter;
establishing, via said wireless communication network, a communication session between said first electronic device and said identified third electronic device;
selecting device settings associated with said identified third electronic device based on said identified device-type of said identified third electronic device;
generating a user interface corresponding to said third electronic device, based on said selected device settings,
wherein said generated user interface comprises at least one first graphical element to control said selected device settings;
updating, based on a device capability of said third electronic device to playback at least one data item, said generated user interface to include at least one second graphical element corresponding to said at least one data item;
controlling said display device to display said updated user interface; and
controlling, based on a user input on said displayed user interface, at least one of said selected device settings of said third electronic device or said playback of said at least one data item on said third electronic device.

15. The method according to claim 14, further comprising generating, an augmented-reality (AR) view on said first electronic device to enable control of said identified third electronic device,
wherein said AR view comprises a field-of-view (FOV) of said third electronic device, at least one graphical control associated with said identified third electronic device or at least one content item compatible with said identified third electronic device.

16. The method according to claim 15, further comprising generating said at least one graphical control on said AR view based on said device-type of each of said identified third electronic device.

17. The method according to claim 15, further comprising:
   selecting a content item of said at least one data item from said AR view on said first electronic device;
   detecting, a drag operation of said selected content item towards one of said at least one second electronic device, on said AR view; and
   communicate based on said detection of said drag operation, said selected content item to said one of said at least one second electronic device.

18. The method according to claim 14, further comprising:
   selecting a specific device setting from said device settings for control of said third electronic device, based on at least one of said device-type, a current operation state of said third electronic device, a data type of said at least one data item, at least one compatible content item, or control functions supported by said third electronic device.

* * * * *